No. 630,088. Patented Aug. 1, 1899.
J. W. NASMITH.
STEAM TRAP.
(Application filed Oct. 11, 1898.)
(No Model.)
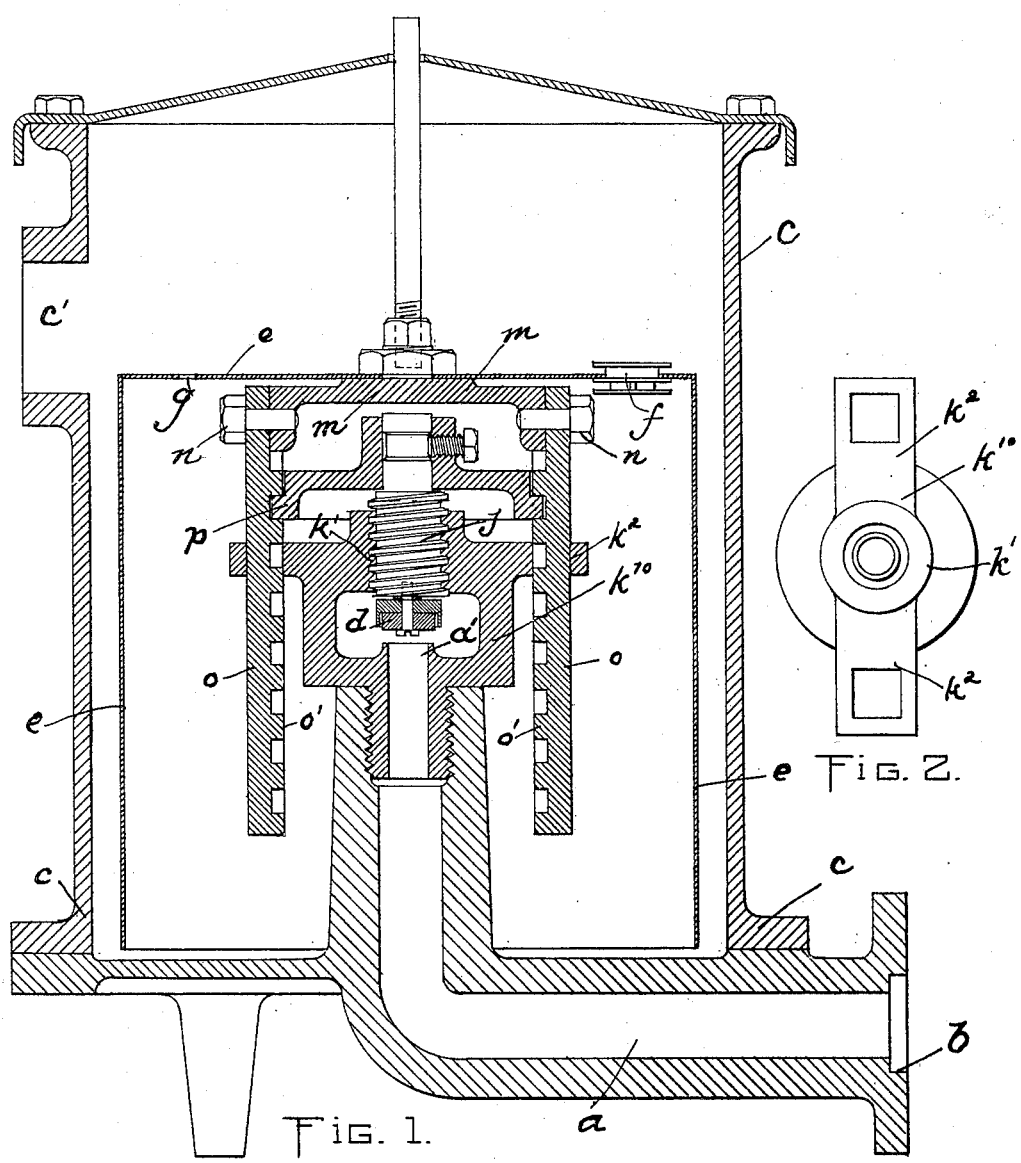
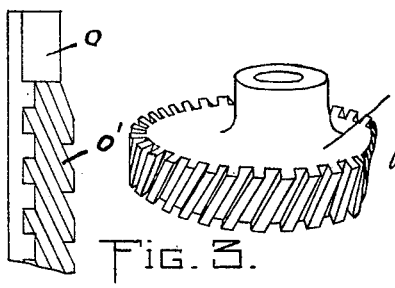
WITNESSES
A. D. Harrison
P. W. Pezzetti
INVENTOR
John William Nasmith
by Wright Brown & Quinby
attys.

UNITED STATES PATENT OFFICE.

JOHN WILLIAM NASMITH, OF MANCHESTER, ENGLAND.

STEAM-TRAP.

SPECIFICATION forming part of Letters Patent No. 630,088, dated August 1, 1899.

Application filed October 11, 1898. Serial No. 693,215. (No model.)

*To all whom it may concern:*

Be it known that I, JOHN WILLIAM NASMITH, of Manchester, in the county of Lancaster, England, have invented certain new and useful Improvements in Steam-Traps, of which the following is a specification.

This invention is an improvement on the trap shown in British Patent No. 17,819 of 1890, said trap comprising a water-receptacle, a conduit for steam and water entering said receptacle and having an outlet therein, a float having a vertical movement in the receptacle and inclosing said outlet, a screw, a fixed nut, and a valve connected with the screw, all located within said float, the valve being adapted to open and close the outlet, and devices which coöperate with the float to rotate the screw and operate the valve when the float rises and falls.

My invention relates to the devices which coöperate with the float in rotating the screw; and it has for its object to provide a simple and compact mechanism, located wholly within the float, whereby the vertical movements of the float are caused to impart rotary movement to the screw without rotation of the float.

The invention consists in the improvements which I will now proceed to describe and claim.

Of the accompanying drawings, forming a part of this specification, Figure 1 represents a vertical central section of a steam-trap embodying my invention. Fig. 2 represents a detail plan view of the screw and the yoke or frame surrounding it. Fig. 3 represents a detail perspective view, partly broken away, showing one of the rack-bars and the coöperating gear removed from engagement with each other.

The same letters of reference indicate the same parts in all the figures.

In the drawings, $a$ represents a conduit, which receives water and steam from a boiler through a suitable pipe connected with the boiler, the conduit being here shown as having a substantially horizontal portion and a substantially vertical portion, the latter being secured to and passing through the bottom of a receptacle $c$. The conduit $a$ has an outlet $a'$, surrounded by a valve-seat on which a valve $d$ is adapted to close to prevent the escape of steam through the outlet $a'$. When the valve is open, matter passing through the outlet $a'$ escapes into the receptacle $c$.

$e$ represents a chamber or float adapted to rise and fall in the receptacle $c$, said float being closed at its upper end and open at its lower end and provided in its head or top with an outlet having a valve $f$, adapted to be moved to close said outlet by pressure within the float. The head or top of the float is also provided with a normally open contracted outlet $g$.

$m$ represents a bar affixed to the head of the chamber $e$. To the ends of said bar are secured, by bolts $n$ $n$, two vertical rack-bars $o$ $o$, on the inner faces of which are cut helical rack-teeth $o'$. These teeth mesh with the correspondingly-formed teeth of a gear $p$, which is affixed to a valve-carrying screw $j$. The screw $j$ is engaged with a nut $k'$, which is formed on a yoke or frame $k^{10}$, affixed to the vertical portion of the conduit $a$, the outlet $a'$ being formed in said yoke. When the gear $p$ and screw $j$ are rotated, the valve is raised or lowered by the conjoint action of the screw and the nut $k'$, the latter being prevented from rotating with the screw by ears $k^2$, formed on the yoke $k^{10}$ and provided with orifices through which the rack-bars $o$ $o$ pass. Rotation of the gear and screw in one direction closes the valve, while the rotation of said parts in the opposite direction opens the valve. The form of the teeth on the rack-bars $o$ and gear $p$ is such that an upward movement of the float $e$ causes the rotation of the gear and screw in the direction required to close the valve $d$, while a downward movement of the float causes opposite rotation of the gear and screw and opens the valve.

The operation of the above-described apparatus is as follows: The receptacle $c$ must be first filled with water up to the level of the outlet or overflow $c'$. The pipe $b$ being opened to connect the conduit $a$ with the cylinder or piping to be cleared, the steam may be turned on. The float $e$ being depressed and the valve $d$ consequently open, the air which is driven before the steam escapes from a conduit $a$ into the float and receptacle $c$. Water follows the air and is added to the supply already in the receptacle $c$, causing an overflow through the outlet $c'$, the water finding its way under the lower end of the float e, which is preferably supported above the bottom of the receptacle c by short legs or projections affixed to the float. The water gradually becomes hotter and hotter, heating the vertical portion of the conduit a, until by the time the water in immediate contact with the steam arrives in the lower portion of said conduit the water surrounding the vertical portion of the conduit is above the boiling-point and low-pressure steam is given off within the float e in sufficient quantity to close the valve f and raise the float, thus closing the valve d. The inflow being checked, the temperature of the water is reduced, and pressure being reduced within the float e the valve f opens and the float falls by its own weight, causing the opening of the valve d and letting more water escape from the conduit into the receptacle c. These oscillations of the float continue for a few minutes, gradually diminishing in amplitude until the float assumes a fixed position and remains stationary. The whole apparatus is then in equilibrium, the valve d having adjusted itself and regulated the outlet of the conduit so as to just permit, under the pressure of the steam, whatever it may be, the outflow of the water of condensation at the same rate as that at which it forms, and neither more nor less is allowed to flow. The air dissolved in the water in the float e finds its exit through the small outlet g as fast as liberated, this outlet being too small to have any effect on the pressure in the float.

It will be seen that the valve-operating mechanism is entirely inclosed within the float, so that the apparatus is compact and none of the working parts are exposed.

I claim—

1. A steam-trap comprising a water-receptacle, a conduit for steam and water entering said receptacle and having an outlet therein, a float having a vertical movement in the receptacle and inclosing said outlet, means for preventing rotary movements of the float, a screw, a fixed nut, and a valve connected with the screw, all located within said float, the valve being adapted to open and close the outlet, and mechanism within the float, connecting the float and screw, whereby vertical movements of the float are caused to rotate the screw.

2. A steam-trap comprising a water-receptacle, a conduit for steam and water entering said receptacle and having an outlet therein, a float having a vertical movement in the receptacle and inclosing said outlet, a screw, a fixed nut, and a valve connected with the screw, all located within said float, the valve being adapted to open and close the outlet, helically-toothed rack-bars attached to the float and located within the same, and a correspondingly-formed gear attached to the screw and meshing with said rack-bars, whereby rotary movements are imparted to the screw when the float rises and falls.

In testimony whereof I have affixed my signature in presence of two witnesses.

JOHN WILLIAM NASMITH.

Witnesses:
GILBERT G. EATON,
CHAS. F. ASHWORTH.